United States Patent
Bellows et al.

(10) Patent No.: US 8,421,604 B2
(45) Date of Patent: Apr. 16, 2013

(54) METHOD AND APPARATUS FOR IDENTIFYING READ ZONE OF RFID READER

(75) Inventors: David E. Bellows, Wantagh, NY (US); Timothy B. Austin, Stony Brook, NY (US); Mark W. Duron, East Patchogue, NY (US); Thomas E. Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 513 days.

(21) Appl. No.: 12/627,023

(22) Filed: Nov. 30, 2009

(65) Prior Publication Data

US 2011/0130085 A1 Jun. 2, 2011

(51) Int. Cl.
*G05B 11/01* (2006.01)

(52) U.S. Cl.
USPC .................. 340/12.51; 340/12.26; 340/572.7

(58) Field of Classification Search .............. 455/1, 271; 340/10.1, 10.3, 572.1–572.9, 12.51, 13.26; 250/515.1; 343/841; 361/816–818
See application file for complete search history.

(56) References Cited

U.S. PATENT DOCUMENTS

| | | | |
|---|---|---|---|
| 4,937,585 A | 6/1990 | Shoemaker | |
| 5,528,222 A | 6/1996 | Moskowitz et al. | |
| 6,121,544 A * | 9/2000 | Petsinger | 174/353 |
| 6,794,000 B2 * | 9/2004 | Adams et al. | 428/40.1 |
| 7,289,884 B1 * | 10/2007 | Takahashi et al. | 700/245 |
| 7,327,262 B2 * | 2/2008 | Motteram et al. | 340/572.1 |
| 7,369,048 B2 * | 5/2008 | Freund | 340/572.1 |
| 7,669,143 B2 * | 2/2010 | Shigekusa | 715/830 |
| 7,821,386 B1 * | 10/2010 | Barrett et al. | 340/457 |
| 7,902,984 B2 * | 3/2011 | Duron et al. | 340/572.1 |
| 7,997,481 B2 * | 8/2011 | Shieh | 235/380 |
| 8,049,769 B2 * | 11/2011 | Nakanishi et al. | 347/171 |
| 2002/0024421 A1 * | 2/2002 | Kang | 340/10.2 |
| 2004/0095244 A1 | 5/2004 | Conwell et al. | |
| 2005/0206555 A1 * | 9/2005 | Bridgelall et al. | 342/127 |
| 2006/0028379 A1 | 2/2006 | Oberle | |
| 2006/0043199 A1 | 3/2006 | Baba et al. | |
| 2006/0103532 A1 | 5/2006 | Van Fleet | |
| 2006/0132312 A1 * | 6/2006 | Tavormina | 340/572.7 |
| 2006/0226989 A1 | 10/2006 | Hillegass | |
| 2007/0041034 A1 * | 2/2007 | Gombert | 358/1.15 |
| 2007/0152058 A1 * | 7/2007 | Yeakley et al. | 235/462.01 |
| 2007/0152830 A1 | 7/2007 | Burr | |
| 2007/0222595 A1 * | 9/2007 | Motteram et al. | 340/572.1 |
| 2007/0257800 A1 * | 11/2007 | Yang et al. | 340/572.7 |

(Continued)

FOREIGN PATENT DOCUMENTS

EP 1865438 A1 12/2007

OTHER PUBLICATIONS

International Search Report and Written Opinion for related counterpart International Patent Application No. PCT/US2010/055551 mailed on Feb. 9, 2011.

(Continued)

*Primary Examiner* — Dominic E Rego

(57) ABSTRACT

An apparatus and method for identifying the read zone of an RFID reader. The apparatus includes a supporting sheet, a reader-position mark on the supporting sheet to indicate a recommended location to position an RFID reader, and a zone-boundary mark on the supporting sheet to indicate a read zone of the RFID reader with a predetermined field strength.

28 Claims, 11 Drawing Sheets

U.S. PATENT DOCUMENTS

| | | |
|---|---|---|
| 2007/0276558 A1* | 11/2007 | Kim .................................. 701/23 |
| 2008/0079585 A1* | 4/2008 | Hirota et al. ................. 340/572.1 |
| 2008/0087723 A1* | 4/2008 | Kargl et al. ..................... 235/380 |
| 2008/0088415 A1* | 4/2008 | Quan ............................. 340/10.3 |
| 2008/0100450 A1* | 5/2008 | Ayyagari et al. ............ 340/572.7 |
| 2008/0238621 A1* | 10/2008 | Rofougaran et al. ......... 340/10.1 |
| 2008/0290993 A1* | 11/2008 | Ryoo et al. .................... 340/10.1 |
| 2008/0309463 A1* | 12/2008 | Godzwon et al. ............. 340/10.1 |
| 2009/0066987 A1* | 3/2009 | Inokuchi ....................... 358/1.13 |
| 2009/0086228 A1* | 4/2009 | Yoshida ......................... 358/1.9 |
| 2009/0160612 A1* | 6/2009 | Varpula et al. ................ 340/10.1 |
| 2009/0167502 A1* | 7/2009 | Erickson et al. .............. 340/10.3 |
| 2009/0174556 A1* | 7/2009 | Horne et al. ................. 340/572.3 |
| 2009/0179742 A1* | 7/2009 | Takeshima et al. ........... 340/10.1 |
| 2009/0184802 A1* | 7/2009 | Park ............................... 340/10.1 |
| 2009/0218401 A1* | 9/2009 | Moran et al. ................... 235/439 |
| 2009/0219158 A1 | 9/2009 | Nikitin et al. |
| 2009/0256349 A1* | 10/2009 | Strubin et al. ................ 285/21.2 |
| 2009/0265133 A1* | 10/2009 | Baek et al. ..................... 702/150 |
| 2009/0295645 A1 | 12/2009 | Campero et al. |
| 2010/0039231 A1* | 2/2010 | Fuchs et al. ................... 340/10.1 |
| 2010/0080345 A1* | 4/2010 | Schilling et al. ................. 378/37 |
| 2010/0097273 A1 | 4/2010 | Biris et al. |
| 2010/0188211 A1* | 7/2010 | Brommer et al. ......... 340/539.32 |
| 2010/0289617 A1* | 11/2010 | Hill ................................ 340/5.61 |
| 2011/0089634 A1* | 4/2011 | Thorson et al. ................ 273/238 |
| 2011/0291810 A1* | 12/2011 | Rokhsaz et al. .............. 340/10.1 |

OTHER PUBLICATIONS

International Preliminary Report on Patentability and Written Opinion for related counterpart International Patent Application No. PCT/US2010/055551 mailed on Jun. 5, 2012.

Non Final Office Action mailed on Mar. 30, 2012 in U.S. Appl. No. 12/626,999, Timothy B. Austin, filed Nov. 30, 2009.

* cited by examiner

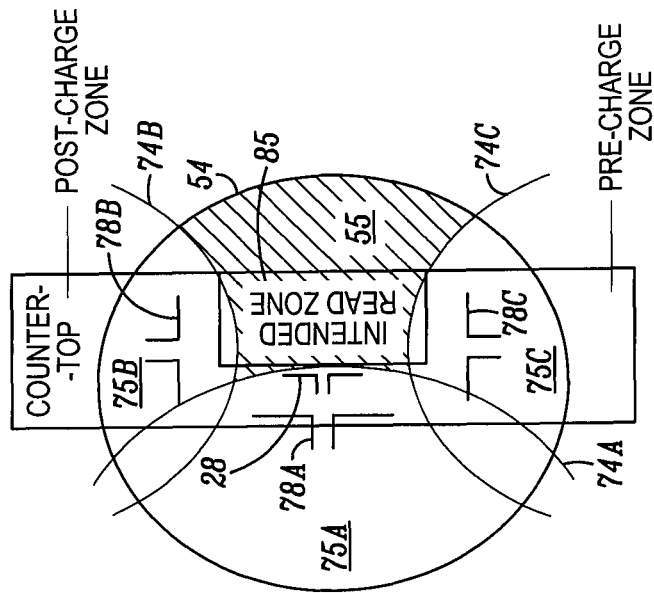
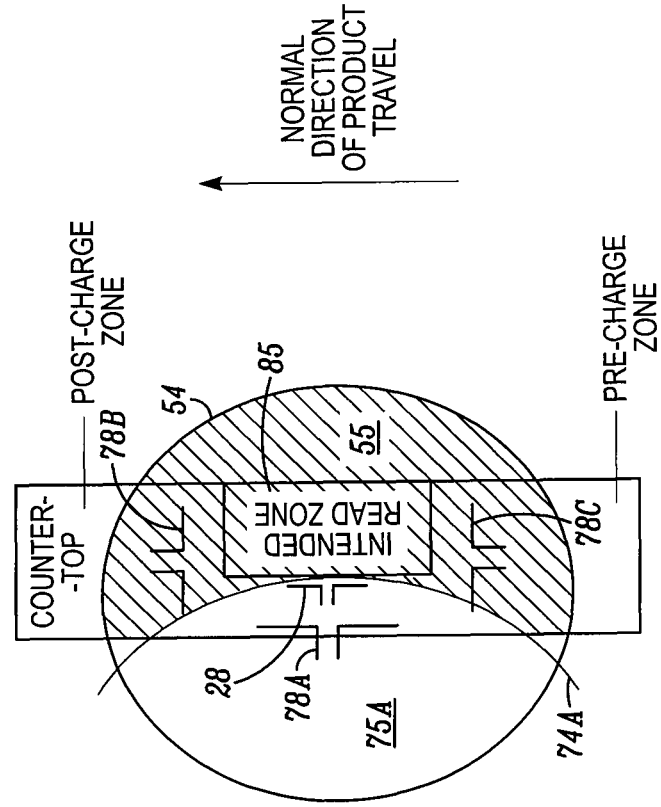
FIG. 8B
FIG. 8A

METHOD AND APPARATUS FOR IDENTIFYING READ ZONE OF RFID READER

FIELD OF THE DISCLOSURE

The present disclosure relates generally to RFID technology.

BACKGROUND

RFID technology generally involves interrogating an RFID tag with radio frequency (RF) waves and reading the responding RF waves with an RFID reader. An RFID tag typically includes a miniscule microchip coupled to an RF antenna. RFID tags can be attached to the object to be identified. An RFID reader typically includes an antenna coupled to a transmitter and a receiver. The RFID reader is generally associated with some read zones, and only those RFID tags located within the read zones are read by the RFID reader. A user generally may not know the boundaries of the read zones, because the field strengths of the RF waves at different locations are not readily visible. Accordingly, it is desirable to find a method or apparatus that can provide some good visual aid to the boundaries of the read zones of RFID readers.

SUMMARY

In one aspect, the invention is directed to an apparatus. The apparatus includes a supporting sheet, a reader-position mark on the supporting sheet to indicate a recommended location to position an RFID reader, and a zone-boundary mark on the supporting sheet to indicate a read zone of the RFID reader with a predetermined field strength.

In another aspect, the invention is directed to an apparatus. The apparatus includes a supporting sheet, a reader-position mark on the supporting sheet to indicate a recommended location to position an RFID reader, and a plurality of zone-boundary marks on the supporting sheet to indicate read zones of the RFID reader. Each zone-boundary mark indicates a corresponding read zone having a predetermined field strength associated therewith.

Implementations of the invention can include one or more of the following advantages. The boundaries of the read zones of RFID readers can be more easily recognized. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 8A-8D depict that RFID jammers can be selectively turned on or turned off to provide some control over the size or the shape of the effective read area in accordance with some embodiments.

Figure 1:
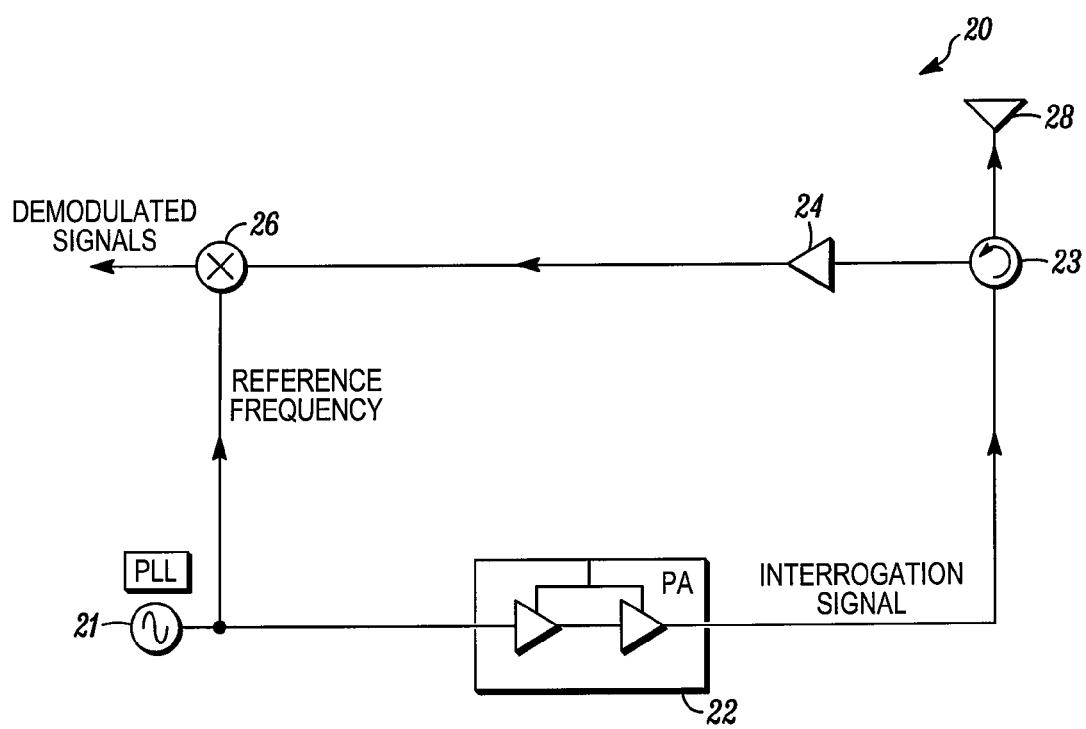
FIG. 1 shows a part of a simplified RFID reader in one specific kind of implementation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows a part of a simplified RFID reader 20 in one specific kind of implementation. In FIG. 1, the RFID reader 20 includes an antenna 28 coupled to a transmitter 22 and a receiver 24. The RFID reader 20 also includes a circulator 23, a demodulator 26, and a frequency generator 21.

In operation, the transmitter 22 generates an RF interrogation signal. This RF interrogation signal is coupled to the antenna 28 through the three-port circulator 23. The electromagnetic waves radiated from the antenna 28 are then received by the antenna in an RFID tag. In response to the interrogation from the RFID reader, the RF tag will reflect back some responding electromagnetic waves coded with the identification information of the RF tag. The responding electromagnetic waves are picked up by the antenna 28 as a responding RF signal. The responding RF signal enters the circulator 23 and is received by the receiver 24. The RF signal received by the receiver, after amplification, is demodulated with demodulator 26 that receives a reference RF signal from the frequency generator 21. The demodulated signals from the demodulator 26 is coupled to certain signal processing circuit to decode from the demodulated signal the identification information returned by the RF tag.

In some implementations, the demodulator 26 is a dual quadrature demodulator, and the demodulated signals from the demodulator 26 can be a demodulated vector signal that includes two components, the in-phase demodulated signal $I_{rx}$ and the quadrature demodulated signal $Q_{rx}$. This demodulated vector signal can be coupled to certain signal processing circuit for further signal processing.

The RFID reader 20 can be used as a stand alone device or can be added to other data capture devices. For example, the RFID reader 20 can be installed at a checkout workstation that may have an optical barcode reader installed also. The RFID reader 20 can also be added to a handheld device, such as, an optical barcode reader. In some implementations, the handheld device having the RFID reader 20 can be operated in both the handheld mode and the workstation mode.

Figure 2:
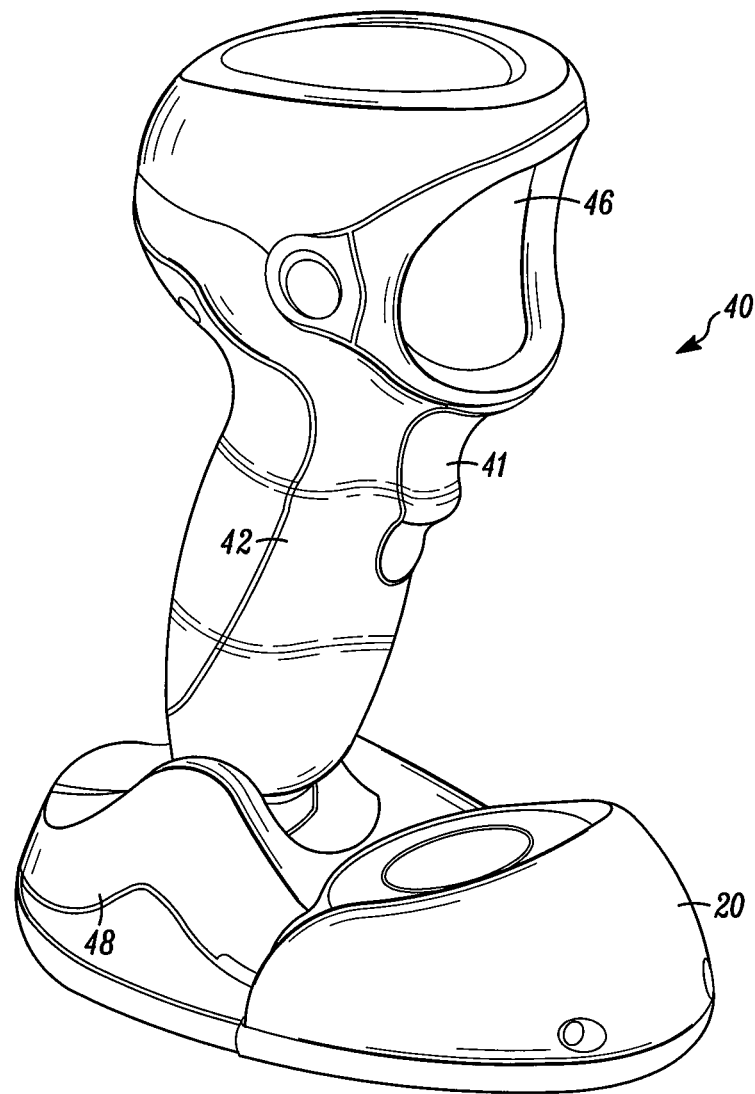
FIG. 2 depicts a handheld device that has the RFID reader installed at its base 48 in accordance with some embodiments.

FIG. 2 depicts a handheld device 40 that has the RFID reader 20 installed at its base 48 in accordance with some embodiments. The handheld device 40 also includes a window 46, a trigger 41, a housing 42, and an optical barcode scanning engine (not shown in the figure) installed in the housing 42. The handheld device 40 thus can be used as an optical barcode reader or as an RFID reader. The base 48 can function as a support for the handheld device 40 when it is placed on a flat surface to function as a stationary workstation.

Figure 3A:
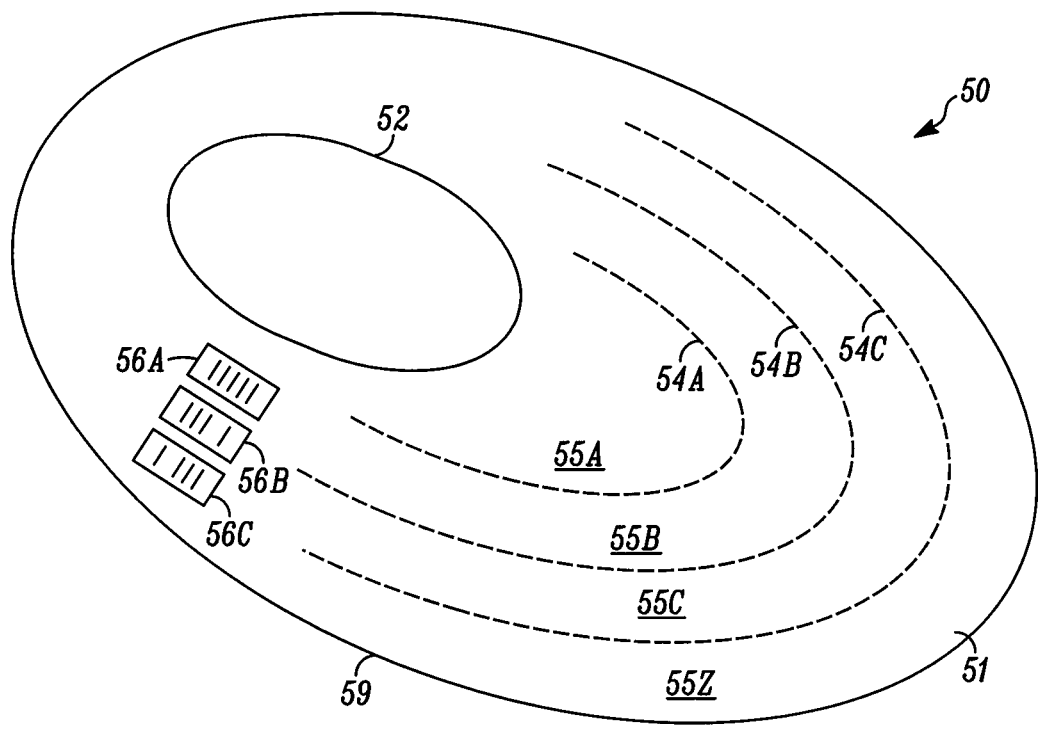
FIGS. 3A-3B depict a mat for use with an RFID reader in accordance with some embodiments.
Figure 3B:
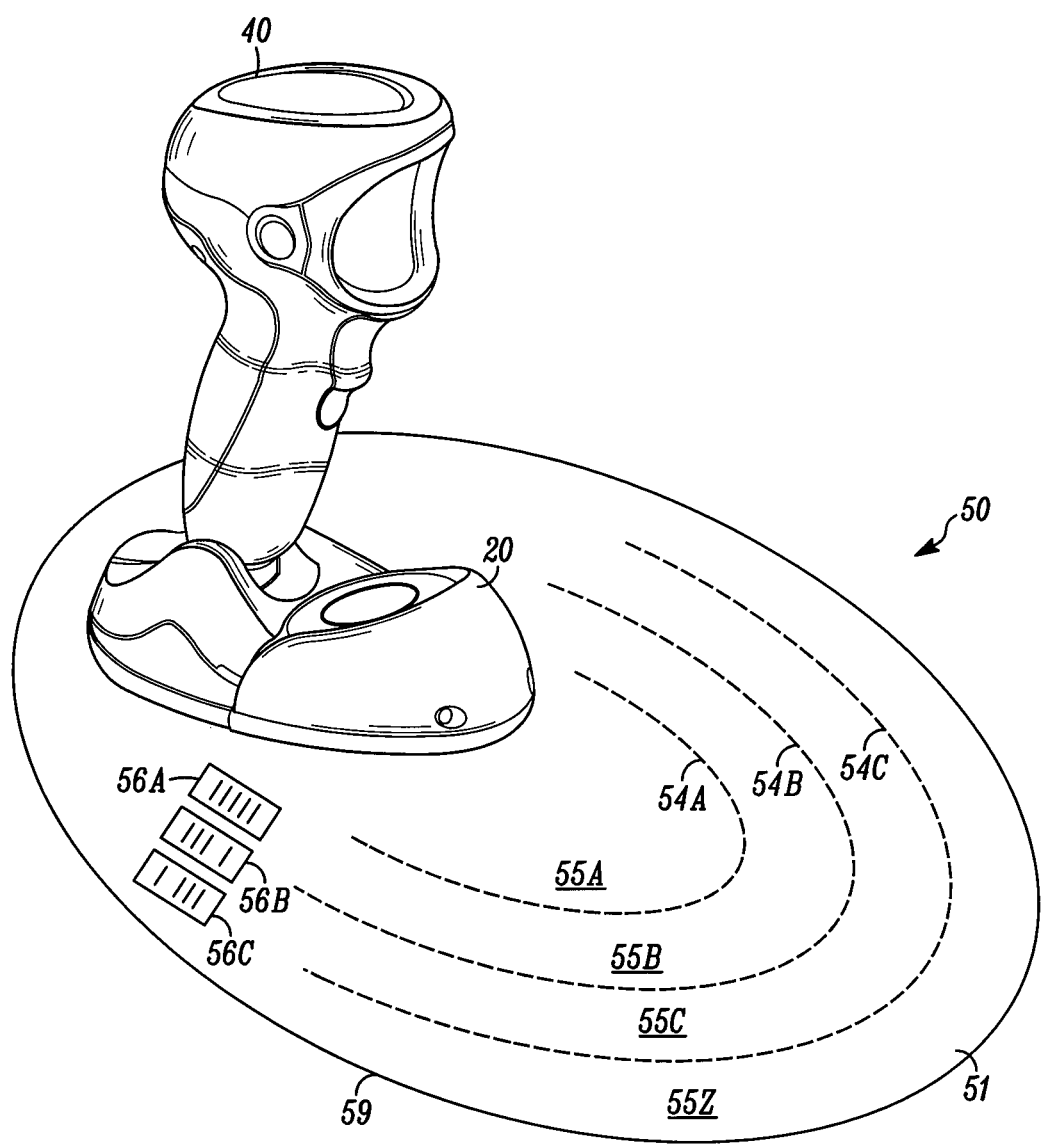

FIGS. 3A-3B depict a mat 50 for use with an RFID reader in accordance with some embodiments. The mat 50 includes a supporting sheet 51, a reader-position mark 52, and one or more zone-boundary marks (e.g., 54A, 54B, or 54C) on the supporting sheet 51. The reader-position mark 52 on the supporting sheet is used to indicate a recommended location to position the RFID reader. For example, as shown in FIG. 3A, the reader-position mark can include an outline representing a footprint of the handheld device 40. Each zone-boundary mark (e.g., 54A) on the supporting sheet 51 is used to indicate a corresponding read zone with a predetermined field strength. Each zone-boundary mark can be in the form of a contour on the supporting sheet 51. For example, in FIGS. 3A and 3B, contours 54A, 54B, and 54C are used as the zone-boundary marks to indicate read zones 55A, 55B, and 55C respectively.

In one implementation, each given zone-boundary mark includes a contour representing those positions where the field strength is substantially equal to the predetermined field strength associated with the corresponding read zone. For example, the contour 54A can be drawn in such away that most of those positions on the contour 54A have substantially the same predetermined field strength $E_A$, and the field strength of any position within the read zones 55A is generally larger than the predetermined field strength $E_A$. Similarly, the contour 54B can be drawn to indicate the read zones 55B in which the field strength of any position is generally larger than a predetermined field strength $E_B$, and the contour 54C can be drawn to indicate the read zones 55C in which the field strength of any position is generally larger than a predetermined field strength $E_C$. In FIGS. 3A and 3B, the predetermined field strength $E_A$ is larger than the predetermined field strength $E_B$, and the predetermined field strength $E_B$ is larger than the predetermined field strength $E_C$.

In FIGS. 3A-3B, parameter barcodes 56A, 56B and 56C printed on the supporting sheet 51 are respectively associated with the contours 54A, 54B and 54C. These parameter barcodes can be used to change the settings of the RFID reader 20. For example, upon reading the parameter barcode 56B with the handheld device 40, the power of the electromagnetic waves emitted by the RFID reader 20 can be adjusted automatically to make the read zone of the RFID reader substantially similar to the read zone 55B as identified by the contour 54B. Similarly, upon reading the parameter barcode 56C with the handheld device 40, the read zone of the RFID 20 can become substantially similar to the read zone 55C.

In FIGS. 3A and 3B, it is also shown that the mat 50 can have a specially designed shape such that the edge 59 can be used as a zone-boundary mark to indicate a read zone 55Z. A parameter barcode 56Z (not shown in the figure) printed on the supporting sheet 51 can be associated with the edge 59 of the mat 50. The parameter barcode 56Z can be read by the handheld device 40 to make the read zone of the RFID reader 20 somewhat similar to the areas enclosed by the edge 59.

Figure 4:
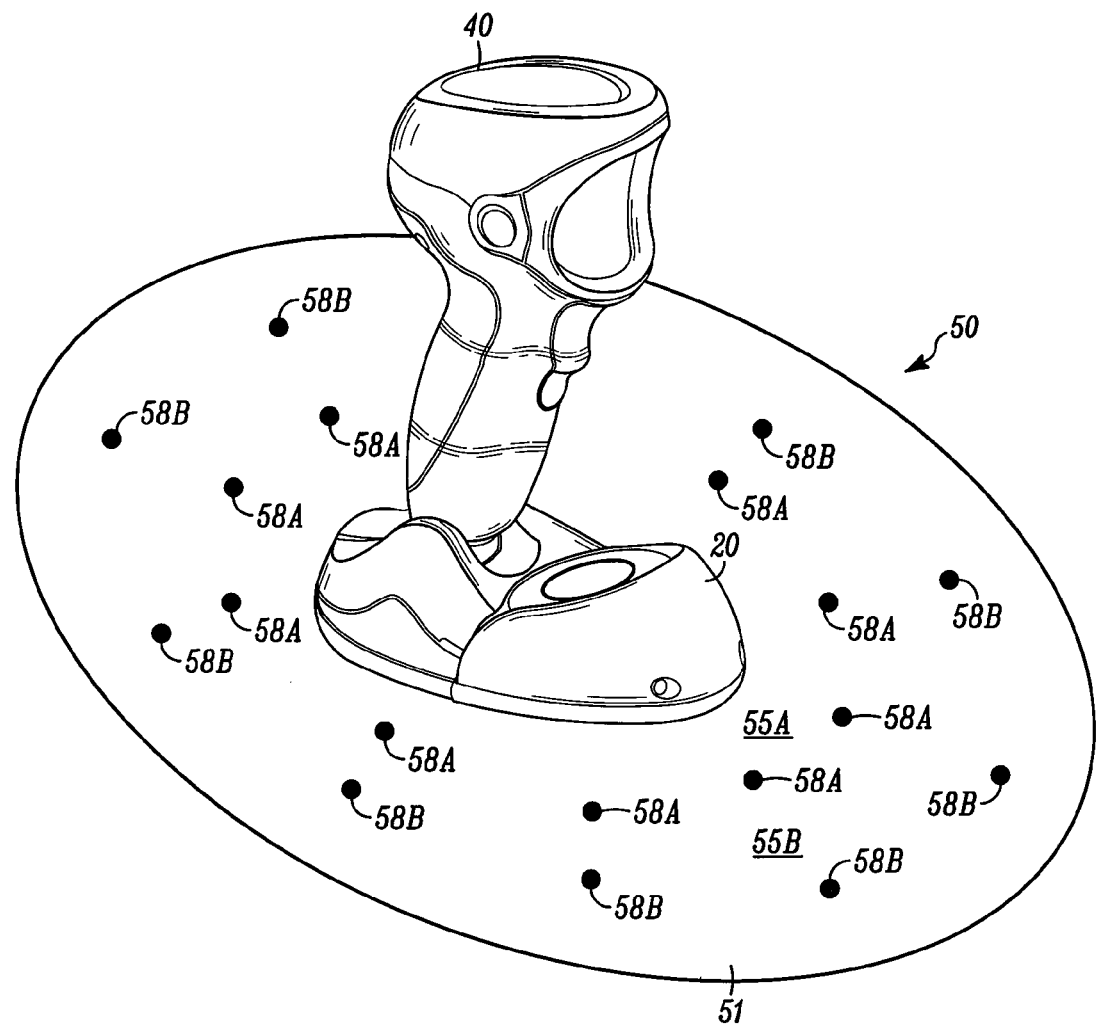
FIG. 4 shows that the zone-boundary mark on the mat can include light indicators distributed at multiple positions on the supporting sheet in accordance with some embodiments.

FIG. 4 shows that the zone-boundary mark on the mat 50 can include light indicators distributed at multiple positions on the supporting sheet 51 in accordance with some embodiments. For example, the zone-boundary mark for the read zone 55A includes light indicators 58A distributed at multiple positions, and the field strength at each of these multiple positions is substantially equal to the predetermined field strength $E_A$ associated with the read zone 55A. Similarly, the zone-boundary mark for the read zone 55B includes light indicators 58B distributed at multiple positions, and the field strength at each of these multiple positions is substantially equal to the predetermined field strength $E_B$ associated with the read zone 55B. The light indicators on the mat 50 can be light emitting diodes or other kinds of light sources. In some implementations, a light indicator on the mat 50 can include a light emitting diode powered by RF radiation from the RFID reader 20.

Figure 5A:
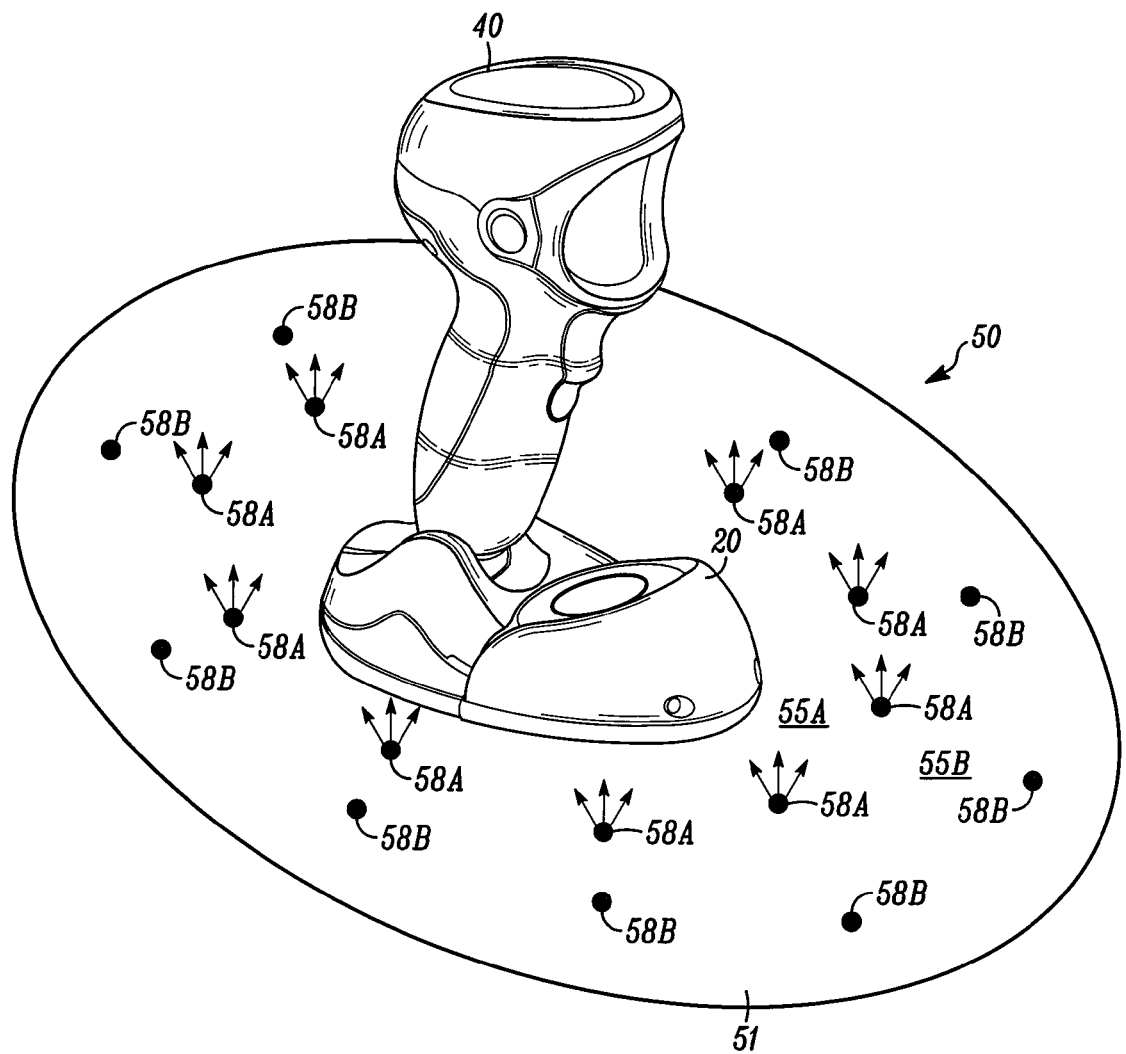
FIGS. 5A-5B depict that a light indicator can be configured to emit visible light when the field strength exceeds a predetermined field strength in accordance with some embodiments.
Figure 5B:
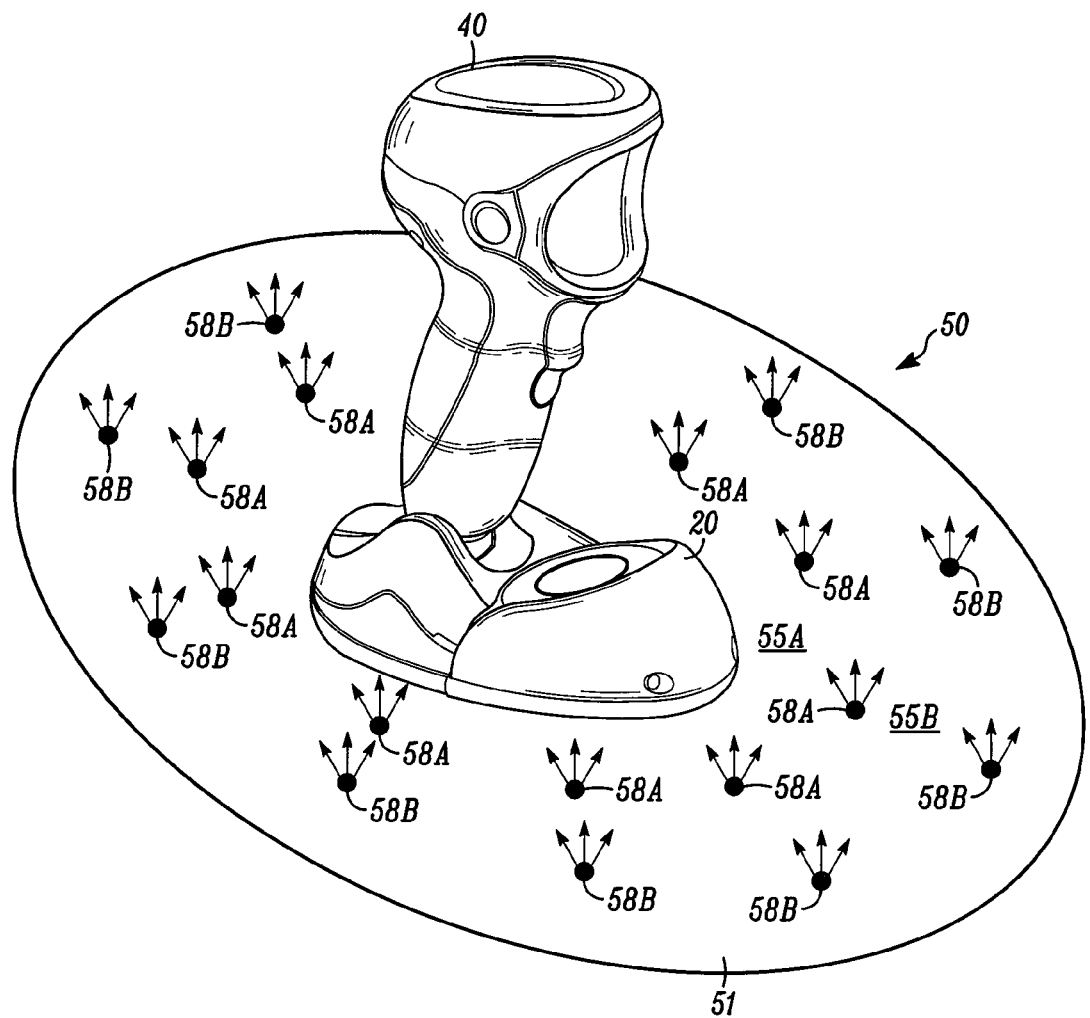

In one implementation, a light indicator at a given position can be configured to emit visible light when the field strength at the given position exceeds the predetermined field strength associated with the corresponding read zone. For example, as shown in FIG. 5A, the light indicators 58A are all lit up to emit some visible light, when the field strength at the position of each of these light indicators exceeds the predetermined field strength $E_A$ associated with the read zone 55A. The light spots from these light indicators 58A forms a light pattern to indicate that the effective read zone of the RFID reader 20 covers at least the read zone 55A. In FIG. 5B, the light indicators 58B are also lit up, when the field strength at the position of each of these light indicators exceeds the predetermined field strength $E_B$ associated with the read zone 55B. The light spots from these light indicators 58B indicate that the effective read zone of the RFID reader 20 covers at least the read zone 55B. The implementations in FIGS. 5A-5B have the advantage of making the effective read zone of the RFID reader 20 somewhat automatically visible to the users.

In addition to making the effective read zone of the RFID reader 20 more visible to users with zone-boundary marks, the effective read zone of the RFID reader 20 can also be modified with RF shields and/or RF jammers. The mat 50 on its own is a good visual aid, but the RF field does not stop instantaneously at the mat's edge. It is therefore desirable to have some level of control over the RFID read zone pattern, especially for a point of sale reader, while still maintaining robust read links in the desired read zones.

Figure 6:
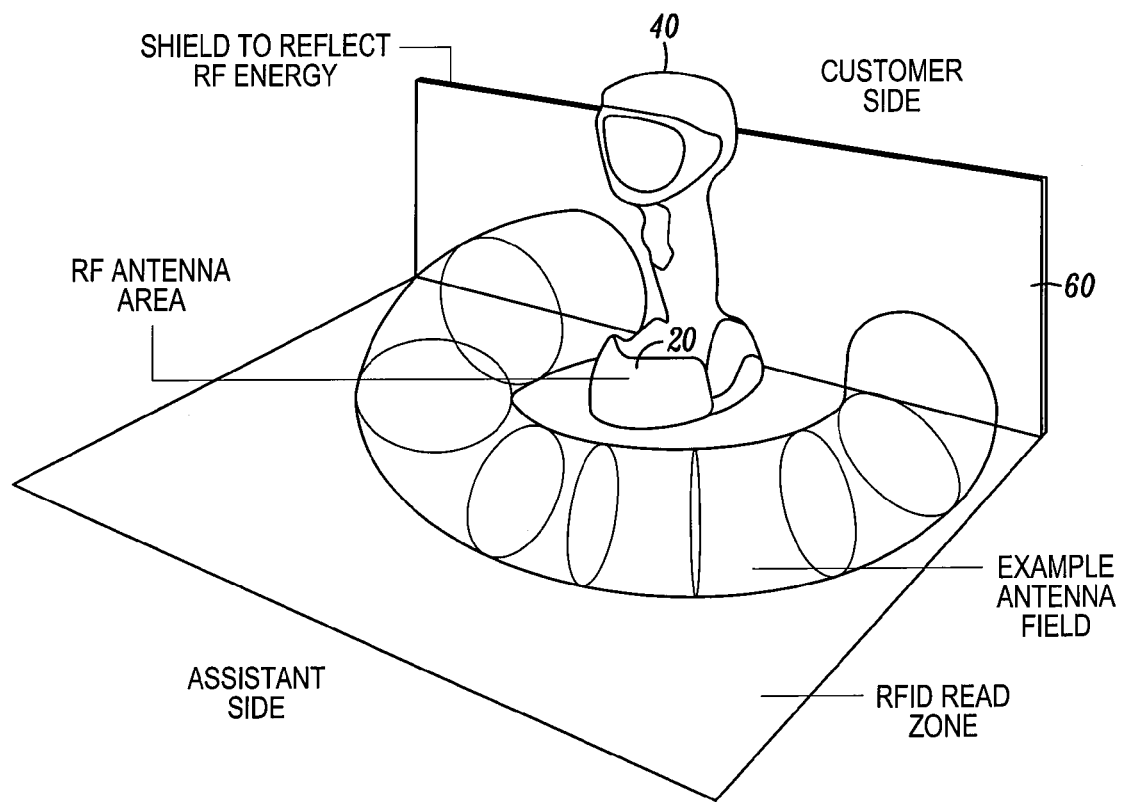
FIG. 6 shows that an RF shield is used to confine the RF fields emitted from the RFID reader to one side of the RF shield in accordance with some embodiments.

FIG. 6 shows that an RF shield 60 is used to confine the RF fields emitted from the RFID reader to one side of the RF shield 60 in accordance with some embodiments. The RF shield 60 can be made from a sheet of conductive material or metal mesh. In FIG. 6, the store assistant is located at one side of the RF shield 60 and the customer is located at the other side of the RF shield 60. The RFID reader 20 is located at the assistant side. Such RF shield 60 can prevent the RFID reader 20 from accidentally reading those RFID tags located at the customer side of the RF shield 60.

Figure 7B:
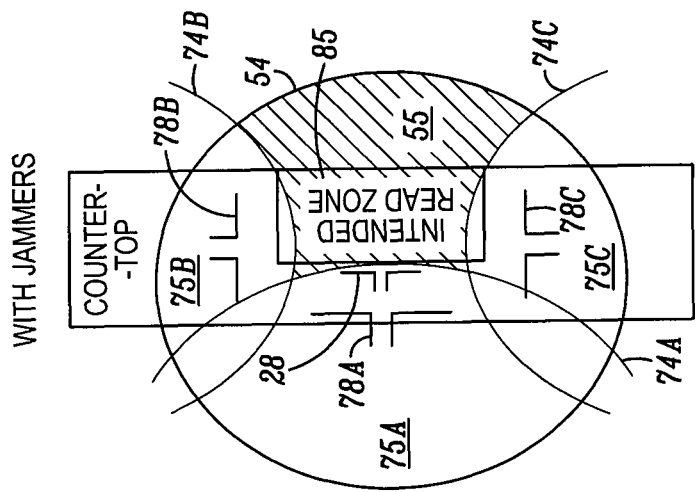
FIGS. 7A-7B depict that the effective read zone of the RFID reader can be modified by one or more RF jammers in accordance with some embodiments.
Figure 7A:
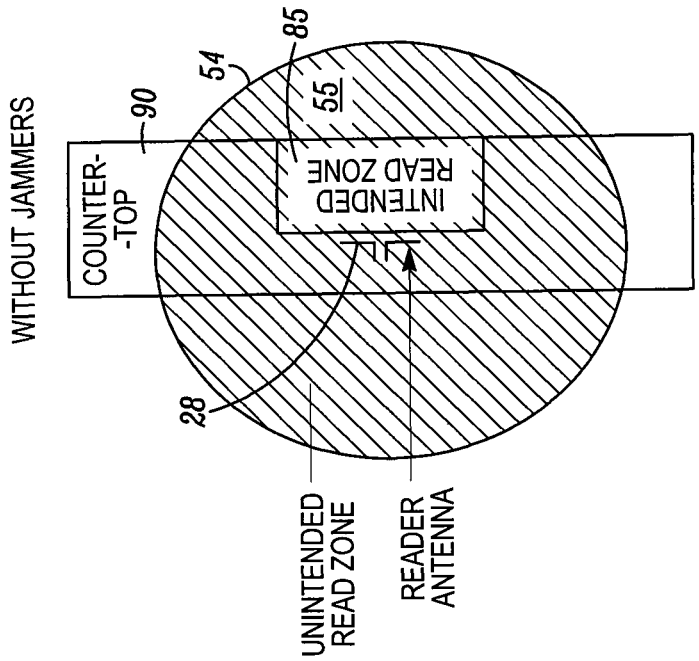

FIGS. 7A-7B depict that the effective read zone of the RFID reader can be modified by one or more RF jammers in accordance with some embodiments. In FIG. 7A, an RFID reader having an antenna 28 is placed on a countertop 90. The effective read zone 55 of the RFID reader is within a shadowed area in FIG. 7A, which is enclosed by a boundary 54 associated with the antenna 28. Such effective read zone 55 is significantly larger than an intended read zone 85; therefore, some RFID tags located outside the intended read zone 85 can be spuriously read by the RFID reader.

In FIG. 7B, RFID jammers 78A, 78B, and 78C are distributed on the countertop. In one implementation, the RFID jammer (e.g., 78A, 78B, or 78C) emits low power (e.g., below 10 mW) and fixed frequency RF radiations to prevent the nearby RFID tags from being synchronized to the reader preamble. The frequency of the RFID jammer generally resides within the RFID frequency band (e.g., the ISM band). The tags have no preselection to channelize the jammer energy. Any frequency that the tag dipole will absorb will tend to jam the tag. The jammer generally has ASK or OOK modulation on it running at least 0.20 of the reader modulation rate. A 12 dB signal to jammer ratio can be used for the tag to burn through the jamming energy when the reader is off channel from the jamming energy. By placing all jammers at the end of the band on a single channel, minimal impact upon the non jammed RFID channels will be noticed outside of the local jamming zones. The jamming energy all remains in channel. Only the chosen jammer channel will cause a jammer to reader collision. All other channels will remain jammer free.

In FIG. 7B, the RFID jammer 78A prevents those RFID tags located within a tag denial zone 75A from being effectively read by the antenna 28 of the RFID reader. The tag denial zone 75A is an area enclosed by a boundary 74A associated the RFID jammer 78A and the boundary 54 associated with the antenna 28. Similarly, the RFID jammers 78B and 78C respectively prevent those RFID tags located within tag denial zones 75B and 75C from being effectively read by the antenna 28 of the RFID reader. The tag denial zones 75B and 75C are defined by boundaries 74B and 74C respectively along with the boundary 54. When all three RFID jammers (i.e., 78A, 78B, and 78C) are turned on, only the shadowed area in FIG. 7B enclosed by four segments of the boundaries 74A, 74B, 74C, and 54 can be effectively read by the RFID reader. This shadowed area in FIG. 7B constitutes the effective read area 55 of the RFID reader after the three RFID jammers are turned on. This effective read area 55 is now more closely matched with the intended read zone 85.

Figure 8D:
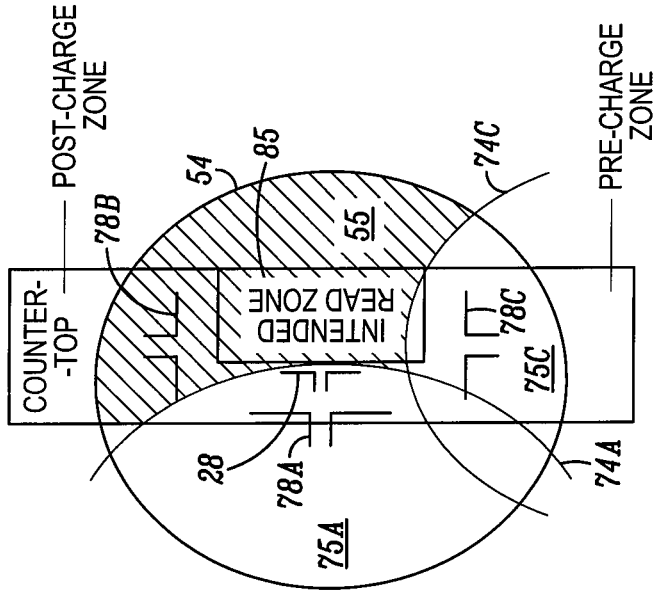
Figure 8C:
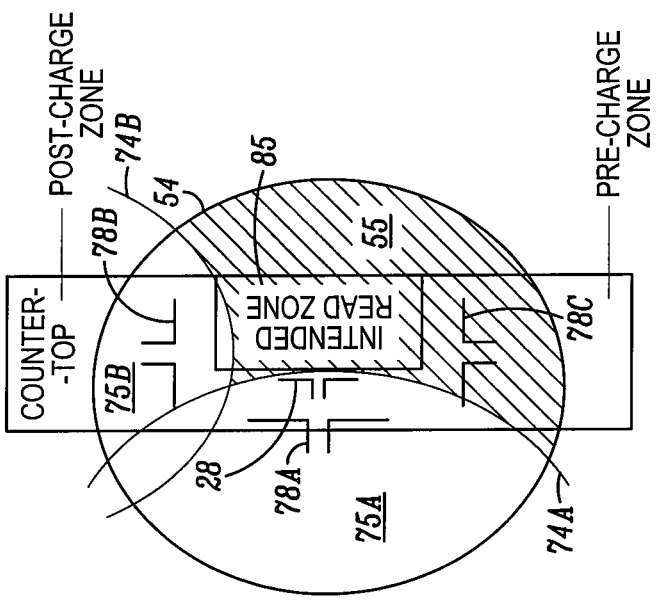

FIGS. 8A-8D depict that RFID jammers 78A, 78B, and 78C can be selectively turned on or turned off to provide some control over the size or the shape of the effective read area 55 in accordance with some embodiments. When one or more tag denial zones are sequentially turned on, the moving direction of a product can be tracked through the various zones by using negative or positive logic. In FIG. 8A, when the RFID jammer 78A is turned on but the RFID jammers 78B and 78C are turned off, all tags in the reader field of view on the countertop can be read by the RFID reader. In FIG. 8B, when all of the three RFID jammers (i.e. 78A, 78B, and 78C) are turned on, only those tags in the intended read zone 85 are read by the RFID reader. In FIG. 8C, when the RFID jammers 78A and 78B are turned on but the RFID jammer 78C is turned off, only those tags in the intended read zone 85 and the pre-charge zone are read by the RFID reader. In FIG. 8D, when the RFID jammers 78A and 78C are turned on but the RFID jammer 78B is turned off, only those tags in the intended read zone 85 and the post-charge zone are read by the RFID reader. Therefore, by turning the denial zones on and off while reading tags, the differences can be used to locate a given tag within a given tag denial zone. Once its location is known, the direction of travel of a given tag can be determined as that tag moves from one denial zone to the next.

In a point of sale application, as each item moves from the pre-charge zone to the post-charge zone, the product cost can be added to the total charges. If one were to take an item from the post-charge zone back through the charge zone to the pre-charge zone, the charges could be automatically removed from the total. If an uncharged for item were to, through some other then normal means, show up in the post-charge zone, it could be easily be identified and charged for. If it were to happen too often, cameras could be triggered and or security alerted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a supporting sheet;
a reader-position mark on the supporting sheet to indicate a recommended location to position an RFID reader;
a zone-boundary mark on the supporting sheet to indicate a read zone of the RFID reader with a predetermined field strength, wherein the zone-boundary mark includes a contour representing multiple positions on the supporting sheet, wherein the field strength at each of the multiple positions is substantially equal to the predetermined field strength; and
a parameter barcode associated with the contour, the parameter barcode storing one or more RFID parameters for being read upon by the RFID reader to change the settings of the RFID reader.

2. The apparatus of claim 1, wherein the reader-position mark includes an outline representing a footprint of the RFID reader.

3. The apparatus of claim 1, wherein the zone-boundary mark is the edge of the supporting sheet.

4. The apparatus of claim 3, further comprising:
a parameter barcode associated with the edge of the supporting sheet, the parameter barcode storing one or more RFID parameters for being read upon by the RFID reader to change the settings of the RFID reader.

5. The apparatus of claim 1, wherein the zone-boundary mark includes light indicators distributed at multiple positions on the supporting sheet, wherein the field strength at each of the multiple positions is substantially equal to the predetermined field strength.

6. The apparatus of claim 5, wherein a light indicator includes a light emitting diode.

7. The apparatus of claim 5, wherein a light indicator includes a light emitting diode powered by RF radiation from the RFID reader.

8. The apparatus of claim 1, wherein the zone-boundary mark includes light indicators distributed at multiple positions on the supporting sheet, wherein a light indicator at a given position is configured to emit visible light when the field strength at the given position exceeds the predetermined field strength.

9. The apparatus of claim 1, further comprising:
a plurality of RFID jammers to prevent RFID tags located near the RFID jammers from being effectively read by the RFID reader.

10. The apparatus of claim 9, wherein the plurality of RFID jammers are distributed on the supporting sheet.

11. The apparatus of claim 1, further comprising:
a shield of an RF reflective material to prevent RFID tags located at one side of the shield from being effectively read by the RFID reader.

12. An apparatus comprising:
a supporting sheet;
a reader-position mark on the supporting sheet to indicate a recommended location to position an RFID reader;
a plurality of zone-boundary marks on the supporting sheet to indicate read zones of the RFID reader, wherein each zone-boundary mark indicates a corresponding read zone having a predetermined field strength associated therewith, wherein each given zone-boundary mark includes a contour representing multiple positions on the supporting sheet, wherein the field strength at each of the multiple positions is substantially equal to the predetermined field strength associated with the read zone corresponding to the given zone-boundary mark; and
a plurality of parameter barcodes on the supporting sheet, each parameter barcode being associated with a contour of a zone-boundary mark, the parameter barcode storing one or more RFID parameters for being read upon by the RFID reader to change the settings of the RFID reader.

13. The apparatus of claim 12, wherein the reader-position mark includes an outline representing a footprint of the RFID reader.

14. The apparatus of claim 12, wherein one of the zone-boundary marks is the edge of the supporting sheet.

15. The apparatus of claim 14, further comprising:
a parameter barcode associated with the edge of the supporting sheet, the parameter barcode storing one or more RFID parameters for being read upon by the RFID reader to change the settings of the RFID reader.

16. The apparatus of claim 12, wherein each given zone-boundary mark includes light indicators distributed at multiple positions on the supporting sheet, wherein the field strength at each of the multiple positions is substantially equal to the predetermined field strength associated with the read zone corresponding to the given zone-boundary mark.

17. The apparatus of claim 16, wherein a light indicator includes a light emitting diode.

18. The apparatus of claim 16, wherein a light indicator includes a light emitting diode powered by RF radiation from the RFID reader.

19. The apparatus of claim 12, wherein each given zone-boundary mark includes light indicators distributed at multiple positions on the supporting sheet, wherein a light indicator at a given position is configured to emit visible light when the field strength at the given position exceeds the predetermined field strength associated with the read zone corresponding to the given zone-boundary mark.

20. The apparatus of claim 12, further comprising:
a plurality of RFID jammers to prevent RFID tags located near the RFID jammers from being effectively read by the RFID reader.

21. The apparatus of claim 20, wherein the plurality of RFID jammers are distributed on the supporting sheet.

22. The apparatus of claim 12, further comprising:
a shield of an RF reflective material to prevent RFID tags located at one side of the shield from being effectively read by the RFID reader.

23. A method comprising:
placing a reader-position mark on a supporting sheet to indicate a recommended location to position an RFID reader; and
placing at least one zone-boundary mark on the supporting sheet to indicate a read zone of the RFID reader with a predetermined field strength, wherein the placing at least one zone-boundary mark on the supporting sheet comprises:
marking a contour on the supporting sheet to represent multiple positions each having a field strength thereof substantially equal to the predetermined field strength; and
setting one or more RFID parameters of the RFID reader by reading a parameter barcode associated with the contour on the supporting sheet.

24. The method of claim 23, further comprising: setting one or more RFID parameters of the RFID reader by reading a parameter barcode on the supporting sheet placed in the vicinity of a segment of the contour.

25. The method of claim 23, wherein the placing at least one zone-boundary mark on the supporting sheet comprises:
placing light indicators on the supporting sheet at multiple positions each having a field strength thereof substantially equal to the predetermined field strength.

26. The method of claim 23, further comprising:
preventing RFID tags located near the RFID jammers from being effectively read by the RFID reader with a plurality of RFID jammers.

27. The method of claim 26, wherein the preventing step comprises:
placing the plurality of RFID jammers on the supporting sheet.

28. The method of claim 23, further comprising:
using a shield of an RF reflective material to prevent RFID tags located at one side of the shield from being effectively read by the RFID reader.

* * * * *